(12) United States Patent
Catania

(10) Patent No.: US 8,060,645 B1
(45) Date of Patent: Nov. 15, 2011

(54) SEMI RELIABLE TRANSPORT OF MULTIMEDIA CONTENT

(75) Inventor: Nicolas Catania, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 168 days.

(21) Appl. No.: 12/472,233

(22) Filed: May 26, 2009

(51) Int. Cl.
*G06F 15/16* (2006.01)
(52) U.S. Cl. .................. 709/234; 709/232; 709/224
(58) Field of Classification Search .................. 709/224, 709/232, 234
See application file for complete search history.

(56) References Cited

U.S. PATENT DOCUMENTS

| | | | | |
|---|---|---|---|---|
| 5,553,083 | A * | 9/1996 | Miller | 714/748 |
| 6,621,799 | B1 * | 9/2003 | Kemp et al. | 709/237 |
| 6,934,257 | B2 * | 8/2005 | Liu et al. | 370/392 |
| 7,827,458 | B1 * | 11/2010 | Salsbury et al. | 714/748 |
| 2003/0227943 | A1 * | 12/2003 | Hallman et al. | 370/503 |
| 2004/0003007 | A1 * | 1/2004 | Prall et al. | 707/200 |
| 2004/0125816 | A1 * | 7/2004 | Xu et al. | 370/411 |
| 2009/0006641 | A1 * | 1/2009 | Yaqoob et al. | 709/231 |

OTHER PUBLICATIONS

Liang, et al., "TCP-RTM: Using TCP for Real Time Multimedia Applications," 10th IEEE Intl. Conference on Network Protocols, 2002, 20 pages.
Liang, et al., "TCP-SMO: Extending TCP to Support Medium-Scale Multicast Applications," 21st Annual Joint Conference of the IEEE Computer andCommunications Societies, 2002, 10 pages.

* cited by examiner

*Primary Examiner* — Philip B Tran
(74) *Attorney, Agent, or Firm* — Fenwick & West LLP

(57) ABSTRACT

Transmission Control Protocol (TCP) segments received from a server are processed to result in improved reliability. An embodiment of the method comprises receiving a first TCP segment from a server and placing the first TCP segment in a segment queue, the first TCP segment having a first sequence number. A determination is made as to whether a second TCP segment is missing from the segment queue based at least in part on a first sequence number. Responsive to determining that the second TCP is missing from the segment queue, placing a placeholder for the second TCP segment in the segment queue. The first TCP segment is delivered to an application responsive to the first TCP segment being the next TCP segment in a sequence.

27 Claims, 4 Drawing Sheets

SEMI RELIABLE TRANSPORT OF MULTIMEDIA CONTENT

BACKGROUND OF THE INVENTION

1. Field of the Invention

This invention pertains in general to the effective use of Transmission Control Protocol (TCP) for the transport of multimedia content.

2. Description of the Related Art

Multimedia content (e.g., video and music) is frequently exchanged over the Internet from a server to a client. To transmit data to a client, a server uses some type of communication protocol. One of the protocols that may be used is Transmission Control Protocol (TCP). TCP guarantees delivery of a stream of data from a server to a client by using a positive acknowledgment technique. When a server sends a data segment to a client, the server expects the client to respond with an acknowledgment message once the client receives the segment. If the client does not respond with the acknowledgment message within a set amount of time, it means that the data segment was lost or corrupted. In response, the server retransmits the data segment to the client. The problem with TCP is that it is optimized for accurate delivery rather than timely delivery. Therefore, the delivery of data may incur long delays because of the wait for retransmissions of lost segments.

Since the delivery of multimedia data in most cases requires fast delivery, servers often use User Datagram Protocol (UDP). UDP is faster than TCP because it does not guarantee delivery of data. UDP never verifies whether a data segment was received by a client. Additionally, UDP drops any segment that is received out of order. Therefore, the client will not have access to all of the data sent by the server.

BRIEF SUMMARY OF THE INVENTION

The present invention provides methods, computer program products, and systems for processing Transmission Control Protocol (TCP) segments received from a server. An embodiment of the method comprises receiving a first TCP segment from a server and placing the first TCP segment in a segment queue, the first TCP segment having a first sequence number. A determination is made as to whether a second TCP segment is missing from the segment queue based at least in part on a first sequence number. Responsive to determining that the second TCP is missing from the segment queue, placing a placeholder for the second TCP segment in the segment queue. The first TCP segment is delivered to an application responsive to the first TCP segment being the next TCP segment in a sequence. The invention has embodiments in computer systems, computer program products, and computer implemented methods.

The features and advantages described in this summary and the following detailed description are not all-inclusive. Many additional features and advantages will be apparent to one of ordinary skill in the art in view of the drawings, specification, and claims hereof.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
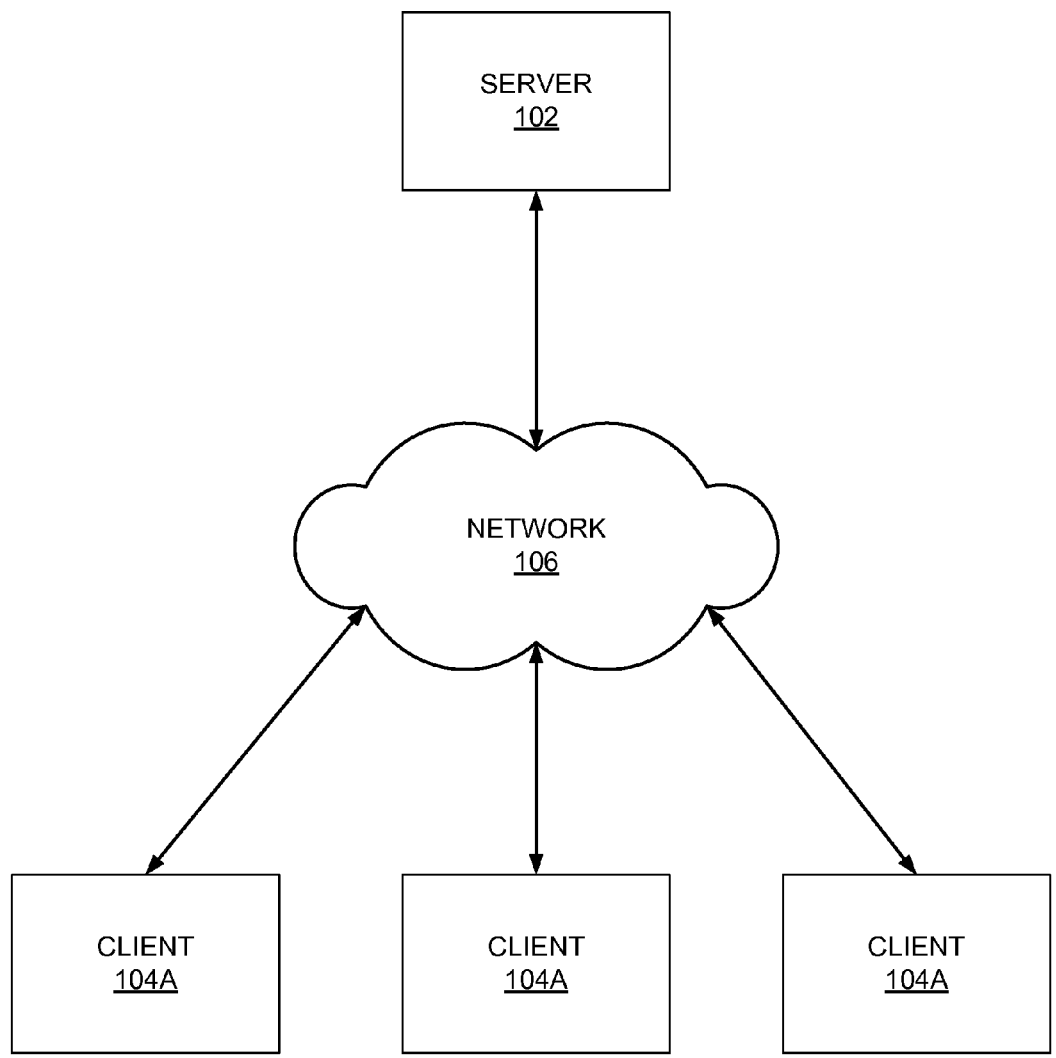
FIG. 1 is a high-level block diagram of a client-server environment according to one embodiment.

FIG. 1 is a high-level block diagram of a client-server environment 100 according to one embodiment. FIG. 1 illustrates a server 102 and three clients 104 connected by a network 106. Only three clients 104 are shown in FIG. 1 in order to simplify and clarify the description. Embodiments of the client-server environment 100 can have any number of clients 104 connected to the network 106.

FIG. 1 and the other figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A," "104B," and/or "104C" in the figures).

The server 102 represents an entity that allows clients 104 to access stored multimedia content. The sources of the multimedia content can be from uploads of content by clients 104, searches or crawls of websites or databases of multimedia content, or the like, or any combination thereof. For example, in one embodiment, the server 102 can be configured to allow upload of content by clients 104. In another embodiment, the server 102 can be configured to only obtain videos from other sources by crawling such sources or searching such sources in real time.

At the receipt of a request from a client 104 for specific multimedia content, the server 102 locates and retrieves the requested content. In one embodiment, the server 102 divides and encapsulates the data stream of the multimedia content into multiple Transmission Control Protocol (TCP) segments. In another embodiment, the server 102 divides and encapsulates the media stream of the multimedia content into Real-time Transport Protocol (RTP) packets. The server 102 encapsulates the RTP packets into multiple TCP segments. The server 102 provides each TCP segment created with a sequence number and sequentially transmits the TCP segments to the client 104 that requested the multimedia content.

Each time a TCP segment is transmitted to the client 104, the server starts a retransmission timer for the TCP segment. The retransmission timer is set to expire at a retransmission timeout (RTO). If the retransmission timer expires and the server 102 has not received an acknowledgment message from the client 104 confirming that the TCP segment was received, the server 102 retransmits the TCP segment because the TCP segment was more than likely lost in transmission.

To simplify and clarify the present description, the data received and shared by the server 102 will be referred to as multimedia content or content, but it should be understood that the server 102 can receive and share data of any media type and file type. Examples of the type of data that is received and shared by the server 102 includes a combination of one or more of the following: text, audio, still images, animation, and video. It will be understood that the term "server" represents any computer system configured to serve content and is not intended to be limited to content uploaded or downloaded via the Internet. In general, functions described in one embodiment as being performed on the server side can also be performed on the client side in other embodiments if appropriate. In addition, the functionality attributed to a particular component can be performed by different or multiple components operating together.

The client 104 represents an entity used by one or more users to communicate with the server 102 over the network 106. A user can use the client 104 to request multimedia content from the server 102 by for example, browsing a catalog of multimedia content, conducting searches using keywords, reviewing play lists from other users or the system administrator (e.g., collections of videos forming channels), or viewing content associated with particular user groups (e.g., communities). In some embodiment, the client 104 is configured to transmit multimedia content to the server 102 for storage to enable the sharing of the content with other clients 104.

In one embodiment, the client 104 is a computer executing a web browser such as MICROSOFT INTERNET EXPLORER or MOZILLA FIREFOX that allows a user to view webpages and multimedia content provided by the server 102. In one embodiment, the web browser includes a video player (e.g., Flash™ from Adobe Systems, Inc.). In other embodiments, the client 104 is a network-capable device other than a computer system, such as a personal digital assistant (PDA), a cellular telephone, a smart-phone, a pager, a television "set-top box" etc. The client can be a standalone device, or embedded into other devices or systems.

In one embodiment, in response to the client 104 requesting multimedia content from the server 102, the client 104 receives TCP segments of the content requested. For each received TCP segment, the client 104 assigns a deadline delivery time to the TCP segment. The deadline delivery time is the cutoff time for delivering the TCP segment to an application on the client 104 to which the TCP segment is intended. The TCP segment can only be delivered to the application at or prior to the deadline delivery time. In one embodiment, the deadline delivery time is assigned to the TCP segment by the server 102 prior to being transmitted to the client 104. Once a deadline delivery time has been assigned to a TCP segment, the client 104 places the TCP segment in a segment queue. In one embodiment, the order in which the segments are placed in the segment queue is based on the sequence numbers assigned to each segment. If a TCP segment is missing from the segment queue, the client 104 creates a placeholder for the missing TCP segment in the queue and assigns a deadline delivery time to the placeholder. The TCP segment may be missing because the TCP segment was lost in transmission or is being delivered out of order. The placeholder represents the missing TCP segment in the segment queue. The deadline delivery time assigned to the placeholder is the cutoff time for delivering the missing TCP segment.

For example, assume a TCP segment, with a segment number one (S1) arrives at the client 104, and the client 104 assigns a deadline delivery time to S1 and places it in the segment queue. If the next segment to arrive is TCP segment three (S3), the client 104 assigns a deadline delivery time to S3 and places it in the segment queue. Since TCP segment two (S2) has not arrived, it signifies that S2 is missing. In response, the client 104 creates a placeholder for S2, assigns a deadline delivery time to the placeholder based on the cutoff time for delivering S2 to the application, and places the placeholder in the segment queue. It should be understood that in the examples herein, a number associated with a TCP segment represents the sequence number of the TCP segment.

The client 104 maintains a process that sequentially delivers the TCP segments in the segment queue to the intended application based on the sequence number of each TCP segment. Each TCP segment in the segment queue is delivered to the intended application at or prior to its respective deadline delivery time. After a TCP segment has been delivered to the intended application, the client 104 sends an acknowledgment message to the server 102 for the TCP segment. When in the process of delivering the TCP segments in the segment queue, if the next TCP segment to be delivered is missing and there is a placeholder in its place, the client 104 waits for the deadline delivery time of the placeholder to be reached. If the missing TCP segment arrives prior to the deadline delivery time being reached, the TCP segment is delivered to the intended application. However, if the deadline delivery time is reached and the placeholder's segment has not arrived, the client 104 can no longer wait for the missing TCP segment to arrive, in which event, the client 104 delivers the next TCP segment in the sequence. The client 104 sends an acknowledgment message to the server 102 after the next TCP segment in the sequence is delivered to the application. The acknowledgment for the next TCP segment causes the server 102 to act as if the missing TCP segment was delivered to the client 104, specifically, it prevents the server 102 from retransmitting the missing segment that is no longer needed.

Continuing with the example from above, after delivering S1 to the application, the client 104 waits for the deadline delivery time of S2's placeholder to be reached. If S2 has not arrived by the time the deadline delivery time has been reached, the client 104 can no longer wait for S2 to arrive and delivers S3 to the application. After delivering S3, the client 104 sends an acknowledgment message to the server 102 for S3. The acknowledgment message of S3 indicates to the server 102 that S3 arrived at the client 104 along with the previous segments, meaning S1 and S2. The acknowledgment message prevents the server 102 from retransmitting S2. If S2 happens to arrive at the client 104 after its placeholder's deadline delivery time has been reached, the client 104 will drop S2, since the client 104 has moved on to delivering the other segments in the segment queue.

Using TCP to transmit multimedia content to a client 104 and assigning a deadline delivery time to each TCP segment received by the client 104 is beneficial in that it allows fast and reliable transmission of multimedia content from the server 102 to the client 104. This is possible because the reliable qualities of TCP are being used, while still avoiding the long delays that may occur when waiting for a missing TCP segment. The long delays are avoided by limiting the amount of time the client 104 waits for a missing TCP segment.

The network 106 represents the communication pathways between the server 102 and the client 104. In one embodiment, the network 106 is the Internet, but may also be any network, including but not limited to a LAN, a MAN, a WAN, a mobile, wired or wireless network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
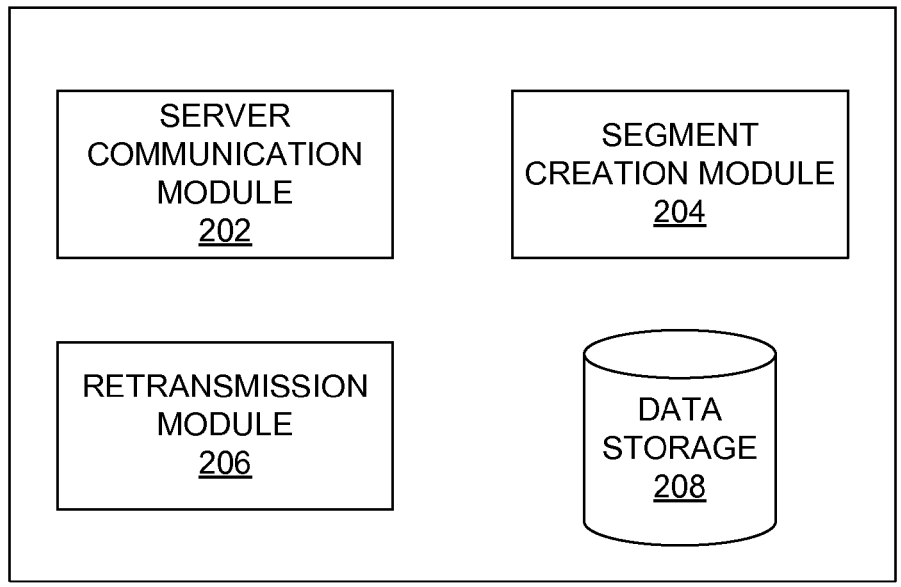
FIG. 2 is a high-level block diagram illustrating a detailed view of the server illustrating the various modules thereof according to one embodiment.

FIG. 2 is a high-level block diagram illustrating a detailed view of the server 102 illustrating the various modules thereof according to one embodiment. In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable storage device (e.g., hard disk), loaded into the memory, and executed by one or more processors included as part of the system. Alternatively, hardware or software modules may be stored elsewhere within the system. The system includes hardware elements necessary for the operations described here, including one or more processors, high speed memory, hard disk storage and backup, network interfaces and protocols, input devices for data entry, and output devices for display, printing, or other presentations of data.

As shown in FIG. 2, the server 102 includes a server communication module 202, which handles all communication with clients 104 via the network 106. The server communication module 202 establishes a connection with any client 104 that sends a request to establish a connection. In one embodiment, the server communication module 202 establishes a connection with a client 104 through the network 106 using a TCP handshake process.

A segment creation module 204 processes requests received by the server communication module 202 for multimedia content. When the server communication module 202 receives a request for multimedia content from a client 104, the segment creation module 204 uses the request to query a data storage 208. In one embodiment, the data storage 208 includes multimedia content shared by the server 102 with clients 104. In one embodiment, once the requested multimedia content has been located, the segment creation module 204 divides and encapsulates the data stream of the media content into TCP segments.

In another embodiment, the segment creation module 204 divides and encapsulates the data stream of the media content into RTP packets. The segment creation module 204 includes a timestamp with each RTP packet created and encapsulates the RTP packets into TCP segments. An integer number of RTP packets are included in each TCP segment. The timestamps of RTP packets included in a TCP segment allow the deadline delivery time of the TCP segment to be determined.

For each TCP segment created, the segment creation module 204 includes at least a sequence number and destination address with the TCP segment. The segment creation module 204 assigns a sequence number to a TCP segment based on the portion of the data stream encapsulated in the TCP segment. For example, S1 will be encapsulated with the first portion of the data stream. In one embodiment, the segment creation module 204 additionally includes in each TCP segment a deadline delivery time based on the time at which the TCP segment has to be delivered to an application on the client 104. The segment creation module 204 sequentially transmits the TCP segments to the client 104 based on their respective sequence number.

A retransmission module 206 retransmits TCP segments that are lost in transmission to a client 104. Each time a TCP segment is transmitted by the segment creation module 204 to a client 104, the retransmission module 206 starts a retransmission timer for the TCP segment. The retransmission timer is set to expire at a RTO (e.g., 500 milliseconds). Prior to the expiration of the retransmission timer, the retransmission module 206 monitors for the receipt of an acknowledgment message from the client 104 for the TCP segment. An acknowledgment message is a confirmation from the client 104 that a TCP segment was received. If an acknowledgment message is received for the TCP segment prior to the expiration of the retransmission timer, the retransmission module 206 cancels the retransmission timer. On the other hand, if the retransmission timer expires and the server communication module 202 has not received an acknowledgment message for the TCP segment, the retransmission module 206 sends a request to the segment creation module 204 for the TCP segment to be recreated and retransmitted to the client 104.

In one embodiment, if an acknowledgment message is received for a TCP segment with a sequence number that is higher than that of a TCP segment for which an acknowledgment has not been received, the retransmission module 206 cancels the retransmission timers of both TCP segments. The retransmission module 206 cancels the retransmission timer of the TCP segment for which an acknowledgment has not been received because the acknowledgment message was more than likely lost in transmission. For example, assume that a client 104 received S1, S2 and S3 and that for each TCP segment the client 104 responded with an acknowledgment message. The server communication module 202 receives the acknowledgment message for S1 and in response the retransmission module 206 cancels the retransmission timer for S1. If the next acknowledgment message received by the server communication module is for S3, the retransmission module 206 will cancel the retransmission timer for S3. Additionally, the retransmission module 206 will cancel the retransmission timer for S2.

Figure 3:
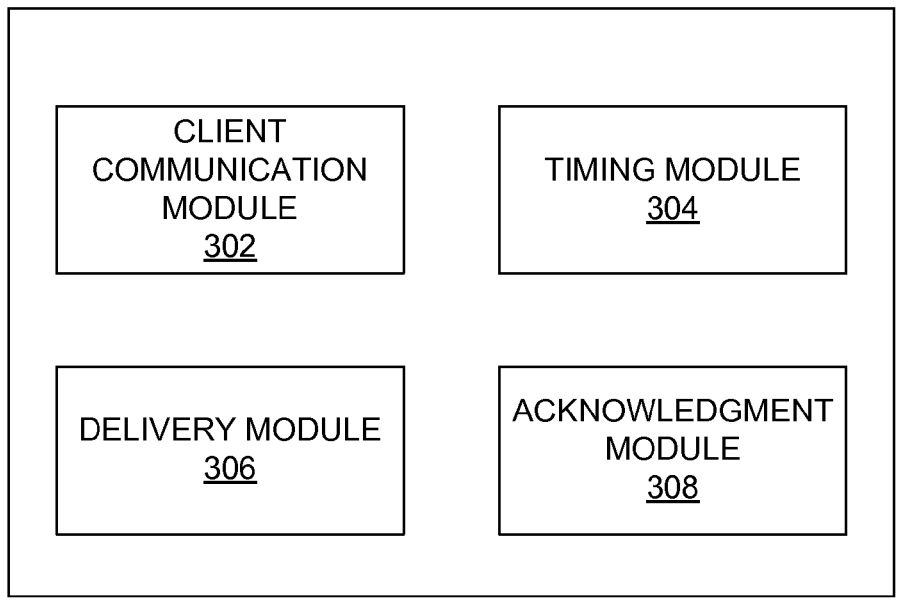
FIG. 3 is a high-level block diagram illustrating a detailed view of a client 104 according to one embodiment.

FIG. 3 is a high-level block diagram illustrating a detailed view of a client 104 according to one embodiment. Those of skill in the art will recognize that other embodiments can have different and/or other modules that the ones described here, and that the functionalities can be distributed among the modules in a different manner.

As shown in FIG. 3, the server 102 includes a client communication module 302, which handles all communication with the server 102 via the network 106. When a user makes a request on the client 104 for specific multimedia content from server 102, the client communication module 302 establishes a connection with the server 102 through the network 106 and forwards the request to the server 102. In one embodiment, the connection is established with the server 102 through a TCP handshake process. When a connection is established with the server 102, the client communication module 302 starts a connection timer. The client communication module 302 receives TCP segments of the multimedia content requested from the server 102 through the network 106.

A timing module 304 assigns a deadline delivery time to each TCP segment received from the server 102. When the client communication module 302 receives a TCP segment of media content requested from the server 102, the timing module 304 writes the TCP segment to a buffer and assigns a deadline delivery time to the TCP segment based on the time at which the TCP segment must be delivered to an application for which the TCP segment is intended. An example, of an application to which the TCP segment must be delivered at or prior to its assigned deadline delivery time is a media player running on a web browser at the client 104. In one embodiment, if the TCP segment includes RTP packets, the timing module 304 determines the deadline delivery time to assign to the TCP segment based on the timestamp of one or more of the RTP packets. In one embodiment, if the server 102 assigned the deadline delivery time to the TCP segment, the timing module 304 verifies that the correct deadline delivery time was assigned to the TCP segment. If the deadline delivery time assigned to the TCP segment by the server is not correct, the timing module 304 appropriately modifies the deadline delivery time.

Once a deadline delivery time has been assigned to the TCP segment, the timing module 304 analyzes the connection timer started by the client communication module 302 to determine whether the deadline delivery time of the TCP segment has been surpassed by the connection timer. If the deadline delivery time of the TCP segment has been surpassed, the timing module 304 drops the TCP segment because the segment arrived too late and the segment can no longer be delivered to the application. On the other hand, if the deadline delivery time of the TCP segment has not been surpassed, the timing module 304 places the TCP segment in a segment queue. In one embodiment, the location in which the TCP segment is placed in the segment queue depends on the sequence number of the TCP segment, since TCP segments included in the segment queue are ordered based on their sequence numbers.

When the timing module 304 places the TCP segment in the segment queue, the timing module 304 analyzes the queue to determine whether one or more TCP segments are missing from the segment queue. The timing module 304 determines that a TCP segment is missing from the queue, if a TCP segment with a sequence number less than that of the TCP segment placed in the queue and greater than that of the last delivered TCP segment from the queue to an application is not in the queue. For each TCP segment that is missing and for which a placeholder has not been created, the timing module 304 creates a placeholder for the missing TCP segment and assigns a deadline delivery time to the placeholder. The deadline delivery time of the placeholder is the cutoff time for delivering the missing TCP segment to the application.

The timing module 304 determines the deadline delivery time of the placeholder based on the timing information of the next TCP segment in the segment queue with a higher sequence number than that of the missing TCP segment. For example, assume S2 is missing from the segment queue, but S3 is in the segment queue. The timing module 304 will determine the deadline delivery time of the placeholder of S2 based on the timing information of S3. In one embodiment, the timing module 304 determines the deadline delivery time of the placeholder based on the deadline delivery time of the next TCP segment. In one embodiment, the deadline delivery time assigned to placeholder is the same as the deadline delivery time of the next TCP segment. In one embodiment, if the next TCP segment includes RTP packets, the timing module 304 determines the deadline delivery time of the placeholder based on the timestamp of one or more of the RTP packets.

In one embodiment, the timing module 304 does not assign deadline delivery times to TCP segments received and only assigns deadline delivery times to placeholders created for missing TCP segments. In one embodiment, the timing module 304 also associates the sequence number of the missing TCP segment with the placeholder. The timing module 304 places the placeholder in the segment queue. In one embodiment, the timing module 304 places the placeholder in the segment queue at the location where the missing TCP segment should be. If the missing TCP segment is received by the client communication module 302 prior to its deadline delivery time being reached by the connection timer, the timing module 304 assigns the deadline delivery time to the missing TCP segment and replaces the placeholder in the segment queue with the missing TCP segment.

For example, assume TCP segment four (S4) is received by the client communication module 302, the timing module 304 assigns a deadline delivery time to the segment. If the deadline delivery time of S4 has not been surpassed by the connection timer, the timing module 304 places the segment in the queue. The timing module 304 analyzes the segment queue and determines that S1 has been delivered to an application, S2 is in the segment queue, and S3 is not in the segment queue. In response, the timing module 304 creates a placeholder for S3 and assigns a deadline delivery time to the placeholder based on the cutoff time for delivering S3 to the application. The timing module 304 places the placeholder in the segment queue. If S3 is received by the client communication module 302 prior to its deadline delivery time being reached, the timing module 304 assigns the deadline delivery time of the placeholder to S3 and replaces the placeholder with S3. On the other hand, if S3 is received by the client communication module 302 once its deadline delivery time has been surpassed, the timing module 304 drops S3.

A delivery module 306 sequentially delivers TCP segments in the segment queue to the intended application based on the sequence number of each TCP segment. The delivery module 306 makes sure that each TCP segment in the segment queue is delivered to the intended application at or prior to the deadline delivery time assigned. When delivering the TCP segments, if the next TCP segment to be delivered in the sequence is in the segment queue, the delivery module 306 removes the TCP segment from the queue and delivers the segment to the intended application. On the other hand, if in the place of the next TCP segment to be delivered is a placeholder (i.e., TCP segment is missing), the delivery module 306 waits for the connection timer to reach the deadline delivery time of the placeholder.

If the missing TCP segment represented by the placeholder is received by the client communication module 302 prior to the connection timer reaching the deadline delivery time, the delivery module 306 delivers the segment to the intended application. However, if the connection timer reaches the deadline delivery time and the missing TCP segment has not been received, the delivery module 306 drops the placeholder and moves on to delivering the next TCP segment in the sequence.

An acknowledgment module 308 communicates with the client communication module 302 to transmit acknowledgment messages to the server 102. When the delivery module 306 delivers a TCP segment from the segment queue to an application, the acknowledgment module 308 transmits an acknowledgment message to the server 102 to confirm that the TCP segment was received. For example, assume S1 is delivered to an application by the delivery module 306, the acknowledgment module 308 sends an acknowledgment message for S1 to the server 102. In one embodiment, the delivery module additionally transmits an acknowledgment message to the server 102, when the delivery module 306 drops a placeholder of a TCP segment whose the deadline delivery time has been reached and the TCP segment has not arrived. The acknowledgment module 308 confirms the missing TCP even though it has not arrived because the TCP segment is no longer needed by the delivery module 306.

Figure 4:
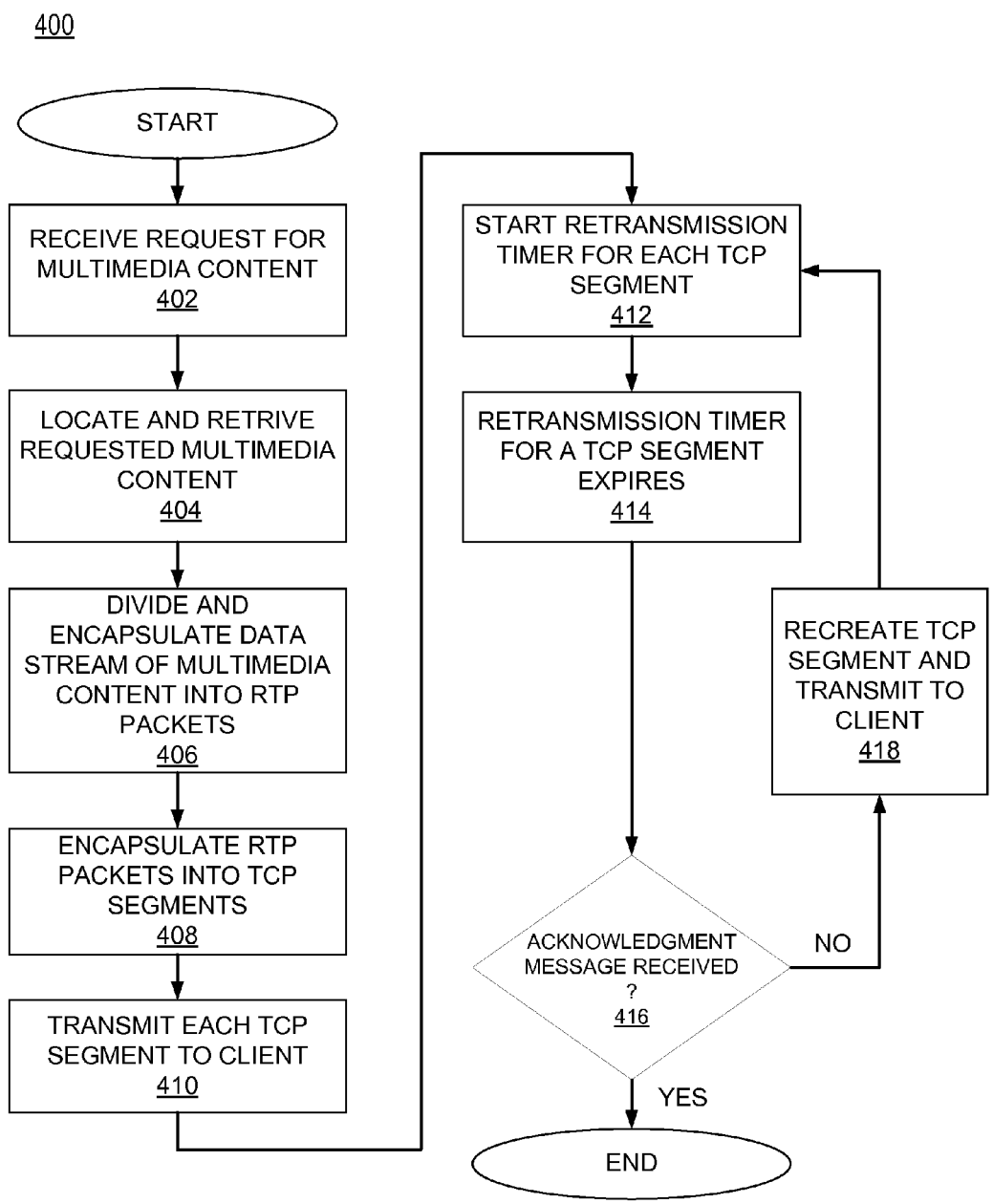
FIG. 4 is a flow chart illustrating the operations of the server in transmitting multimedia content to a client.

FIG. 4 is a flow chart 400 illustrating the operations of the server 102 in transmitting multimedia content to a client 104. Those of skill in the art will recognize that other embodiments can perform the steps of FIG. 4 in different orders. Moreover, other embodiments can include different and/or additional steps than the ones described here.

The server 102 receives 402 a request from a client 104 for specific multimedia content. In response to the request, the server locates 404 and retrieves the requested multimedia content. To transmit the multimedia content to the client 104, the server 102 divides 406 the data stream of the content and encapsulates the data into multiple RTP packets. The server 102 includes a timestamp with each RTP packet created. The RTP packets are encapsulated 408 by the server 102 into multiple TCP segments. Each TCP segment includes one or more RTP packets.

The server 102 sequentially transmits the TCP segments to the client 104 that requested the multimedia content. For each TCP segment that the server 102 transmits 410, the server 102 starts 412 a retransmission timer for the segment that is set to expire at a RTO. When the retransmission timer expires 414 for the TCP segment, the server 102 determines 416 whether an acknowledgment message has been received for the segment. If an acknowledgment message was received, it signifies that the TCP segment successfully arrived at the client 104. On the other hand, if an acknowledgement message has not been received, it signifies that the TCP segment was more than likely lost in transmission to the client 104. In response, the server 102 recreates 418 the TCP segment and transmits it to the client 102. A new retransmission timer is started for the recreated TCP segment.

Figure 5:
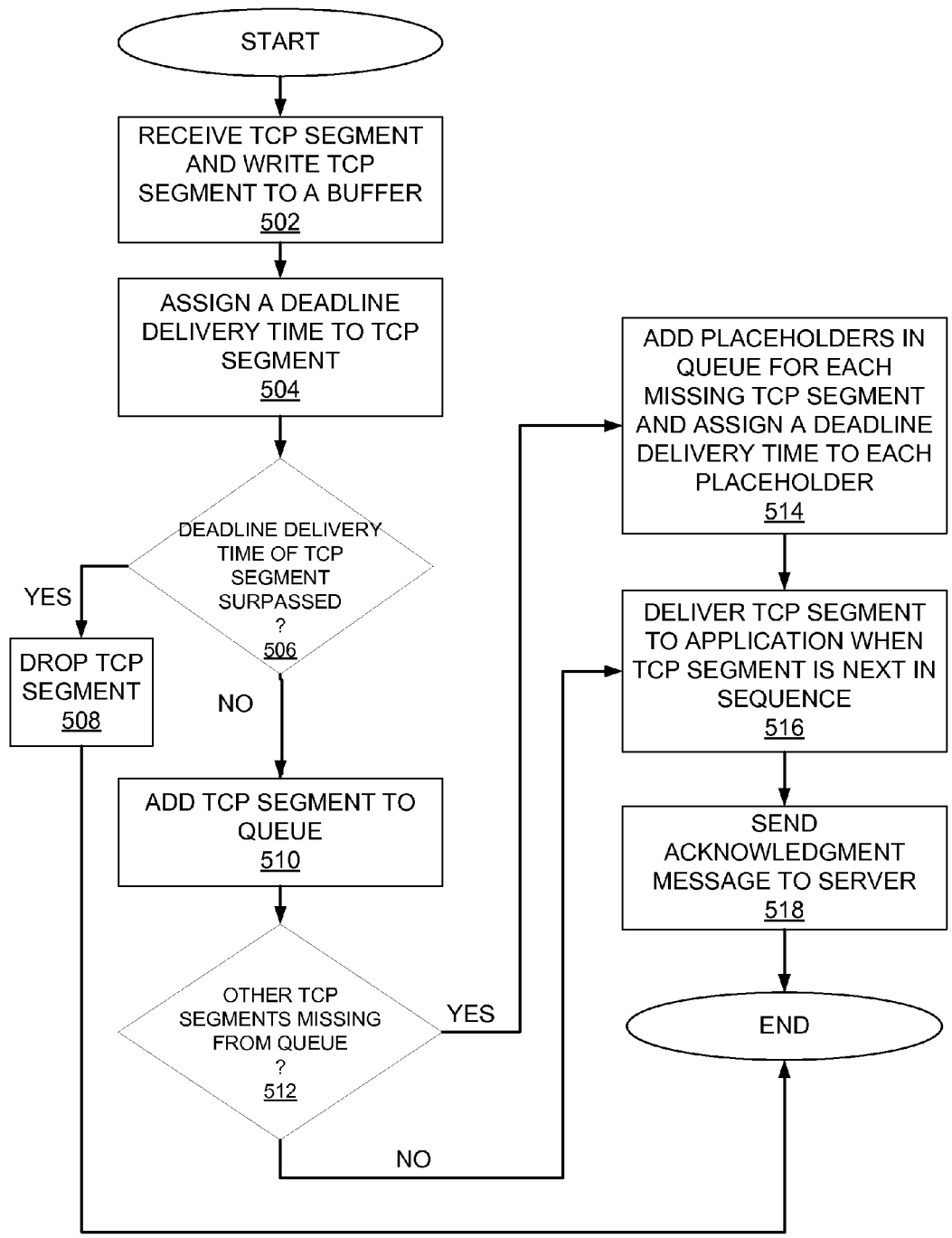
FIG. 5 is a flow chart illustrating the operations of a client in processing a TCP segment of multimedia content requested from the server.

FIG. 5 is a flow chart 500 illustrating the operations of a client 104 in processing a TCP segment of multimedia content requested from the server 102. Those of skill in the art will recognize that other embodiments can perform the steps of FIG. 5 in different orders. Moreover, other embodiments can include different and/or additional steps than the ones described here. Assume for purposes of this example that the client 104 has established a connection with the server 102 and has transmitted a request for multimedia content to the server 102. When the client 104 establishes the connection with the server 102, the client 104 starts a connection timer.

The client 104 receives 502 a TCP segment of the multimedia content requested from server 102 and writes the TCP segment to a buffer. The client 104 assigns 504 a deadline delivery time to the TCP segment, which is the cutoff time for delivering the segment to an application to which the segment is intended. In one embodiment, the client 104 assigns the deadline delivery time to the TCP segment based on the timestamp of one or more RTP packets included in the segment.

The client 104 analyzes the connection timer and determines 506 whether the deadline delivery time of the TCP segment has been surpassed by the connection timer. If the deadline delivery time of the TCP segment has been surpassed, the client 104 drops 508 the segment because the segment can no longer be delivered to the application. Alternatively, if the deadline delivery time of the TCP segment has not been surpassed, the client 104 adds 510 the TCP segment to a segment queue. When the client 104 places the TCP segment in the segment queue, the client 104 analyzes the segment queue to determine 512 whether one or more TCP segments are missing from the queue. The client 104 determines that a TCP segment is missing from the segment queue, if a TCP segment with a sequence number less than that of the TCP segment placed in the segment queue and greater than that of the last delivered TCP segment is not in the segment queue. For each TCP segment missing from the segment queue, the client 104 adds 514 a placeholder in the queue for the missing TCP segment and assigns a deadline delivery time to the placeholder. The deadline delivery time assigned to the placeholder is the cutoff time for delivering the missing TCP segment to the application.

The TCP segments in the segment queue are delivered sequential to an intended application based on the sequence number of each TCP segment. When the next TCP segment in the sequence to be delivered is the TCP segment placed in the segment queue, the client 104 delivers 516 the segment to the intended application. The client sends 520 an acknowledgment message to server 102 to confirm that the TCP segment was received.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable storage medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for processing Transmission Control Protocol (TCP) segments received from a server, the method comprising:
   receiving a first TCP segment from the server and placing in a segment queue the first TCP segment, the first TCP segment having a first sequence number of a sequence;
   determining whether a second TCP segment is missing from the segment queue based at least in part on the first sequence number;
   responsive to determining that the second TCP segment is missing from the segment queue, placing in the segment queue a placeholder for the second TCP segment;
   assigning a deadline delivery time to the placeholder, the deadline delivery time determined based on a cutoff time for delivering the second TCP segment to an application to which the second TCP segment is intended; and
   responsive to the second TCP segment not being received from the server by the deadline delivery time, skipping the second TCP segment and moving on to deliver a next TCP segment in the sequence.

2. The method of claim 1, further comprising:
   assigning a deadline delivery time to the first TCP segment; and
   delivering the first TCP segment to the application at or prior to the deadline delivery time assigned to the first TCP segment being reached.

3. The method of claim 2, further comprising:
   determining the deadline delivery time of the first TCP segment based on a timestamp of a Real-time Transport Protocol (RTP) packet included in the first TCP segment.

4. The method of claim 1, wherein determining whether the second TCP segment is missing from the segment queue, comprises:
   responsive to determining that a second sequence number associated with the second TCP segment is less than the first sequence number of the first TCP segment and greater than a third sequence number associated with the last TCP segment delivered in the sequence, determining that the second TCP segment is missing.

5. The method of claim 1, further comprising:
   responsive to receiving the second TCP segment prior to the deadline delivery time being reached, replacing the placeholder in the segment queue with the second TCP segment.

6. The method of claim 5, further comprising:
   delivering the second TCP segment to the application at or prior to the deadline delivery time being reached.

7. The method of claim 1, further comprising:
   responsive to receiving the second TCP segment after the deadline delivery time has been reached, dropping the second TCP segment.

8. The method of claim 1, further comprising:
   transmitting an acknowledgment message for the first TCP segment.

9. The method of claim 1, wherein the sequence is based on the sequence number associated with each TCP segment received from the server.

10. A computer program product comprising a non-transitory computer readable storage medium having computer program instructions and data embodied thereon for processing Transmission Control Protocol (TCP) segments received from a server, the computer program instructions and data to configure a processor to perform the operations comprising:
    receiving a first TCP segment from the server and placing in a segment queue the first TCP segment, the first TCP segment having a first sequence number of a sequence;
    determining whether a second TCP segment is missing from the segment queue based at least in part on the first sequence number;
    responsive to determining that the second TCP segment is missing from the segment queue, placing in the segment queue a placeholder for the second TCP segment;
    assigning a deadline delivery time to the placeholder, the deadline delivery time determined based on a cutoff time for delivering the second TCP segment to an application to which the second TCP segment is intended; and
    responsive to the second TCP segment not being received from the server by the deadline delivery time, skipping the second TCP segment and moving on to deliver a next TCP segment in the sequence.

11. The computer program product of claim 10, wherein the computer program instructions and data further configure the processor to perform the operations comprising:
    assigning a deadline delivery time to the first TCP segment; and
    delivering the first TCP segment to the application at or prior to the deadline delivery time assigned to the first TCP segment being reached.

12. The computer program product of claim 11, wherein the computer program instructions and data further configure the processor to perform the operations comprising:
determining the deadline delivery time of the first TCP segment based on a timestamp of a Real-time Transport Protocol (RTP) packet included in the first TCP segment.

13. The computer program product of claim 10, wherein determining whether the second TCP segment is missing from the segment queue, comprises:
responsive to determining that a second sequence number associated with the second TCP segment is less than the first sequence number of the first TCP segment and greater than a third sequence number associated with the last TCP segment delivered in the sequence, determining that the second TCP segment is missing.

14. The computer program product of claim 10, wherein the computer program instructions and data further configure the processor to perform the operations comprising:
responsive to receiving the second TCP segment prior to the deadline delivery time being reached, replacing the placeholder in the segment queue with the second TCP segment.

15. The computer program product of claim 14, wherein the computer program instructions and data further configure the processor to perform the operations comprising:
delivering the second TCP segment to the application at or prior to the delivery time being reached.

16. The computer program product of claim 10, wherein the computer program instructions and data further configure the processor to perform the operations comprising:
responsive to receiving the second TCP segment after the deadline delivery time has been reached, dropping the second TCP segment.

17. The computer program product of claim 10, wherein the computer program instructions and data further configure the processor to perform the operations comprising:
transmitting an acknowledgment message for the first TCP segment.

18. The computer program product of claim 10, wherein the sequence is based on the sequence number associated with each TCP segment received from the server.

19. A computer system for processing Transmission Control Protocol (TCP) segments received from a server, the system comprising:
a computer processor; and
a non-transitory computer-readable storage medium storing computer program modules adapted to execute on the computer processor, the computer program modules comprising:
a communication module configured to receive a first TCP segment from the server and placing in a segment queue the first TCP segment, the first TCP segment having a first sequence number;
a timing module configured to:
determine whether a second TCP segment is missing from the segment queue based at least in part on the first sequence number;
place in the segment queue a placeholder for the second TCP segment, responsive to determining that the second TCP segment is missing from the segment queue; and
assign a deadline delivery time to the placeholder, the deadline delivery time determined based on a cut-off time for delivering the second TCP segment to an application to which the second TCP segment is intended; and
a delivery module configured to skip the second TCP segment and move on to delivering a next TCP segment in the sequence in response to the second TCP segment not being received from the server by the deadline delivery time.

20. The system of claim 19, wherein the timing module is further configured to assign a deadline delivery time to the first TCP segment and the delivery module is further configured to deliver the first TCP segment to the application at or prior to the first deadline delivery time assigned to the first TCP segment being reached.

21. The system of claim 20, wherein the timing module is further configured to:
determine the deadline delivery time of the first TCP segment based on a timestamp of a Real-time Transport Protocol (RTP) packet included in the first TCP segment.

22. The system of claim 19, wherein the timing module is further configured to:
determine that the second TCP segment is missing from the segment queue, responsive to determining that a second sequence number associated with the second TCP segment is less than the first sequence number of the first TCP segment and greater than a third sequence number associated with the last TCP segment delivered in the sequence.

23. The system of claim 19, wherein the timing module is further configured to:
replace the placeholder in the segment queue with the second TCP segment, responsive to receiving the second TCP segment prior to the deadline delivery time being reached.

24. The system of claim 23, wherein the delivery module is further configured to:
deliver the second TCP segment to the application at or prior to the deadline delivery time being reached.

25. The system of claim 19, wherein the timing module is further configured to:
drop the second TCP segment, responsive to receiving the second TCP segment after the delivery time has been reached.

26. The system of claim 19, further comprising:
an acknowledgment module configured to transmit an acknowledgment message for the first TCP segment.

27. The system of claim 19, wherein the sequence is based on the sequence number associated with each TCP segment received from the server.

* * * * *